April 5, 1955  K. HERREGARDEN  2,705,646
VEHICLE WHEEL SUSPENSION
Filed Oct. 15, 1954  2 Sheets-Sheet 1

INVENTOR
KJELL HERREGARDEN

BY
McMorrow, Berman + Davidson
ATTORNEYS

April 5, 1955  K. HERREGARDEN  2,705,646
VEHICLE WHEEL SUSPENSION
Filed Oct. 15, 1954  2 Sheets-Sheet 2
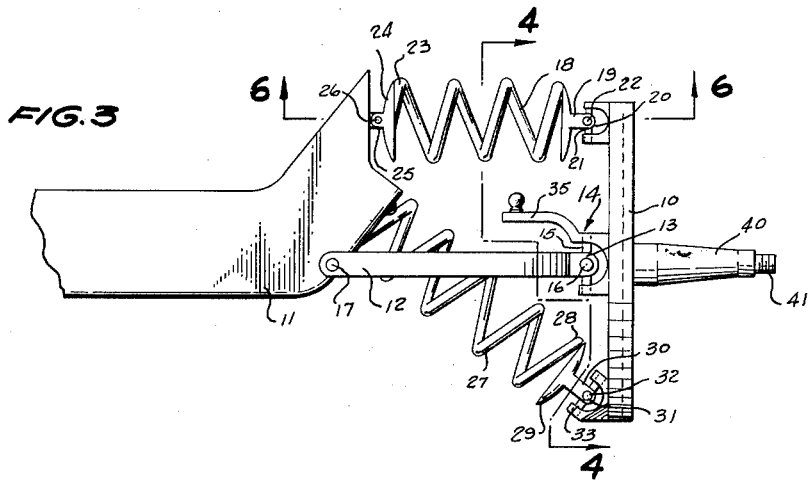
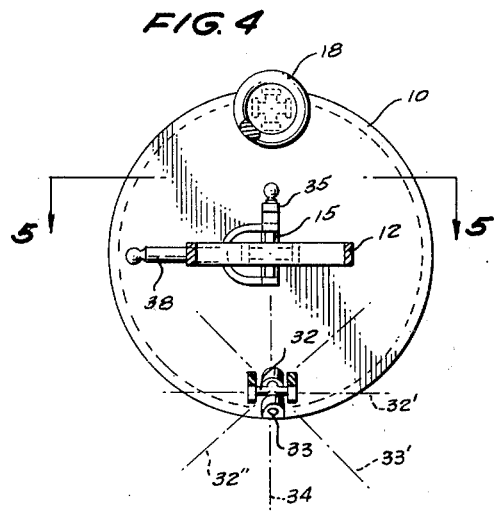
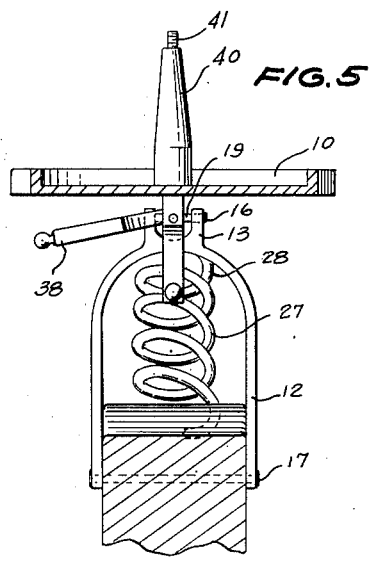
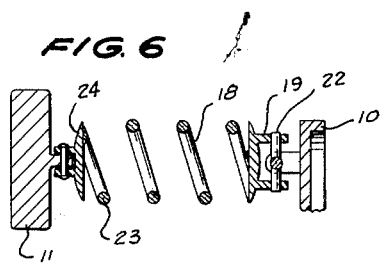
INVENTOR
KJELL HERREGARDEN
BY
McMorrow, Berman & Davidson
ATTORNEYS United States Patent Office 2,705,646
Patented Apr. 5, 1955

2,705,646

VEHICLE WHEEL SUSPENSION

Kjell Herregarden, Skien, Norway

Application October 15, 1954, Serial No. 462,543

2 Claims. (Cl. 280—96.2)

The present invention relates to a vehicle wheel suspension for automotive vehicles and in particular to wheels independently suspended on each end of a chassis frame cross member.

The primary object of the present invention is to provide vehicle wheel suspension having a combination of springs permitting fast, short-radius turns without skidding.

Another object of the present invention is to provide a front wheel axle assembly including a universal joint connection to the wheel drum at the top, at the center, and at the bottom side permitting the wheel drum to have universal movement with respect to the connectors which secure the wheel drum to the cross frame member.

A still further object of the present invention is to provide a wheel axle assembly having a pair of compression springs for each wheel, the first of which is arranged horizontally to resist side thrust movements of the wheel, and the other of which is positioned angularly upward to resist both side thrust movements of the wheel and movements of the wheel due to bumps and road shock.

A still further object of the present invention is to provide a vehicle wheel suspension including a universal joint having the axis of rotation of the axle element connected to the wheel drum disposed at an angle to the vertical but positioned to bisect the vertical axis of rotation of the wheel drum, so that the rotative movement of the axle element secured to the compression spring exerts a torsional moment of force to the compression spring to provide a centering action for the wheel drums.

These and other objects and advantages of the present invention will be fully apparent from the following description when taken in connection with the annexed drawings, in which:

Figure 3 is a front view in greater detail in elevation of the present invention;

Figure 4 is an end view on line 4—4 of Figure 3;

Figure 5 is a vertical view partially in cross section on line 5—5 of Figure 4; and Figure 6 is a detail view in cross section on line 6—6 of Figure 3.

Figure 1:
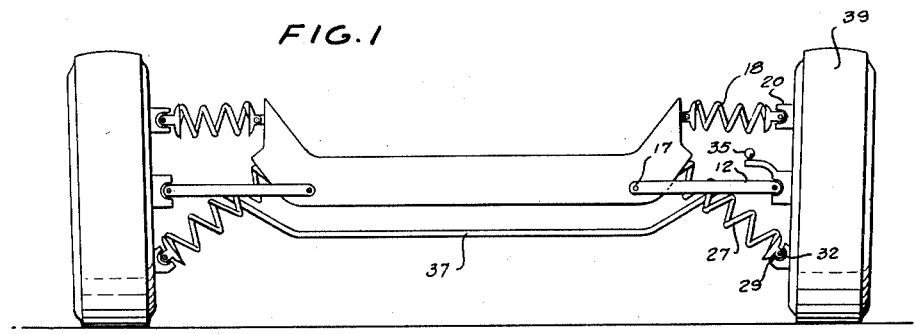
Figure 1 is a front view in elevation of the present invention.

Referring in greater detail to the drawings of which like numerals indicate like parts throughout the several views, the invention is seen to consist of a wheel drum 10, positioned adjacent to and connected to one end of a chassis frame cross member 11, which has its longitudinal axis horizontally disposed, and connected to it by a horizontally disposed U-shaped link bar 12 having its bight 13 connected to the wheel drum 10 by means of a universal joint 14 having a vertical axle 15 and a horizontal axle 16.

The link bar 12 is connected by its legs to the cross member 11 adjacent the one end thereof by means of a horizontal pin 17, which provides for movement about a horizontal axis of the link bar 12.

A first compressible spring 18 is positioned in circumposed relation with respect to the link bar 12 and has one end 19 connected to the wheel drum 10 by means of a universal joint 20 having a vertical axle 21 and a horizontal axle 22. This universal joint 20 provides for universal movement of the spring 18 with respect to the wheel drum 10.

The other end of the spring 23 is secured to a cup member 24 having a pair of bosses 25 connected to the cross frame 11 by means of a pivot pin 26 which is horizontally disposed to provide for movement about a horizontal axis of the first spring 18 with respect to the cross member 11.

A second compressible spring 27 is disposed in an upright angular position with respect to the wheel drum 10 and has its one end 28 secured in a cup 29 which is provided with arms 30 pivotally secured to the horizontal axle 31 of the universal joint 32, the other axle 33 of which is arranged at an angle to the vertical. As seen most clearly in Figure 4, the rotation of the wheel drum 10 about a vertical axis, indicated by the reference numeral 34, causes the angularly disposed axle 33 to assume the position indicated by the dotted line at 33'. The horizontal axle having an axis indicated by the dotted line 32' is then shifted to the position indicated by the reference numeral 32", this causes the second compressible spring 27 to have a torsional or twisting moment of force applied to its end 28. The recovery of this spring 27 to its original position against this force provides for a centering action of the assembly which, together with the "toe-in" of the wheels, helps to assist the steering of the vehicle.

Figure 2:
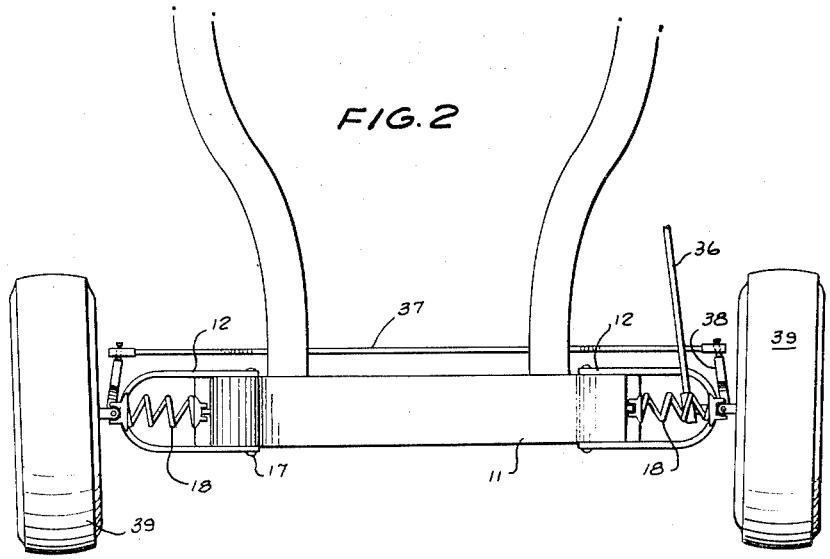
Figure 2 is a top plan view of the present invention as attached to the frame of an automobile.

A tie rod arm 35 is provided for attachment to the conventional steering apparatus of the vehicle which includes the cross tie rod 37, as seen in Figures 1 and 2. A steering rod arm 35 is connected to the wheel drum 10 to which the drag rod 36, as seen in Figure 2, is attached. A cross tie rod 37, as seen in Figures 1 and 2, connects each of the steering knuckle arms 38, as shown in Figures 2, 4 and 5.

The wheel 39 is secured to each of the spindles 40 by conventional means including the threaded bolt 41.

In operation, the wheel drum 10, under conditions of turns, and skidding turns, will tend to compress the spring 27 and to stretch the spring 18. Under conditions of bumpy roads, the spring 27 will receive upward and sideward thrusts, while the spring 18 will receive compression thrust, permitting the wheels 39 to bow outwardly slightly at the bottom.

Better control of the vehicle and bumpy roads and during short, fast, turns is claimed for the present invention due to its unique and novel arrangement of springs and universal joints.

While only a single preferred embodiment has been here shown and described, other embodiments of the present invention may be made and practiced and many changes and modifications may be made within the scope of the appended claims without departing from the spirit of the invention.

What is claimed is:

1. In a front wheel assembly including a chassis frame cross member, a wheel drum arranged adjacent to and spaced from one end of said member, a horizontally disposed U-shaped link bar having the bight connected to said drum for universal movement with respect to said drum and having the legs pivotally connected to said member adjacent said one end for movement about a horizontal axis, a first compressible spring positioned in superimposed relation with respect to said link bar and having one end connected to said drum for universal movement with respect to said drum and having the other end pivotally connected to said frame member for movement about a horizontal axis, a second compressible spring arranged in an upright angular position with respect to said drum and having one end connected to said drum for universal movement with respect to said drum and having the other end fixedly connected to said frame member.

2. In a front wheel assembly including a chassis frame cross member, a wheel drum arranged adjacent to and spaced from one end of said member, a horizontally disposed U-shaped link bar having the bight connected to said drum for universal movement with respect to said drum and having the legs pivotally connected to said member adjacent said one end for movement about a horizontal axis, a first compressible spring positioned in superimposed relation with respect to said link bar and having one end connected to said drum for universal movement with respect to said drum and having the other end pivotally connected to said frame member for movement about a horizontal axis, a second compressible spring arranged in an upright angular position with respect to said drum and having one end connected to said drum for universal movement with respect to said drum and having the other end fixedly connected to said frame member at a downward angle with respect to the longitudinal axis of said frame member.

References Cited in the file of this patent

UNITED STATES PATENTS

| | | |
|---|---|---|
| 1,561,037 | Tucker | Nov. 10, 1925 |
| 1,919,670 | Roos | July 25, 1933 |
| 2,133,652 | Best | Oct. 18, 1938 |
| 2,273,630 | Dunham et al. | Feb. 17, 1942 |

OTHER REFERENCES

Serial No. 368,848, Wilfert et al. (A. P. C.), published May 25, 1943.